(12) United States Patent
Klavuhn et al.

(10) Patent No.: US 12,724,209 B2
(45) Date of Patent: Sep. 1, 2026

(54) LOOPBACK DUST CAP FOR FIBER OPTIC LINK ERROR DETECTION AND METHOD OF MAKING SAME

(71) Applicant: CORNING RESEARCH & DEVELOPMENT CORPORATION, Corning, NY (US)

(72) Inventors: Tory Allen Klavuhn, Granite Falls, NC (US); Eric Stephan ten Have, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 101 days.

(21) Appl. No.: 19/013,449

(22) Filed: Jan. 8, 2025

(65) Prior Publication Data

US 2025/0244539 A1 Jul. 31, 2025

Related U.S. Application Data

(60) Provisional application No. 63/627,150, filed on Jan. 31, 2024.

(51) Int. Cl.
*G02B 6/38* (2006.01)
*G01M 11/00* (2006.01)

(52) U.S. Cl.
CPC ........... *G02B 6/3849* (2013.01); *G01M 11/30* (2013.01)

(58) Field of Classification Search
CPC ............................. G02B 6/3849; G01M 11/30
See application file for complete search history.

(56) References Cited

U.S. PATENT DOCUMENTS

| | | | |
|---|---|---|---|
| 6,554,485 | B1 | 4/2003 | Beatty et al. |
| 7,330,624 | B2 | 2/2008 | Isenhour et al. |
| 7,630,610 | B2 | 12/2009 | Cobb, III et al. |
| 9,146,351 | B2 | 9/2015 | Hughes et al. |
| 9,709,755 | B2 | 7/2017 | Larkin |
| 10,101,545 | B2 | 10/2018 | Isenhour et al. |
| 2003/0123838 | A1 | 7/2003 | Wang et al. |
| 2007/0274658 | A1 | 11/2007 | Isenhour et al. |
| 2008/0310795 | A1 | 12/2008 | Parkman et al. |
| 2010/0074588 | A1 | 3/2010 | Zimmel et al. |
| 2011/0026886 | A1 | 2/2011 | Ott et al. |

(Continued)

FOREIGN PATENT DOCUMENTS

| | | | |
|---|---|---|---|
| CA | 2753661 | C | 9/2017 |
| CN | 215526180 | U | 1/2022 |

(Continued)

*Primary Examiner* — Jamil Ahmed
(74) *Attorney, Agent, or Firm* — Adam R. Weeks

(57) ABSTRACT

A loopback dust cap for a fiber optic cable including at least two optical fibers terminated by a connector. The dust cap includes a body having a plurality of cavities including one cavity configured to receive one ferrule of the connector and another cavity configured to receive another ferrule of the connector. The plurality of cavities also defines surfaces in the body that, when the connector engages the dust cap, collimate an optical beam emitted by one optical fiber, redirect the collimated optical beam, and focus the collimated optical beam on another optical fiber. The dust cap is thereby configured to couple optical signals between one optical fiber and another optical fiber of the fiber optic cable.

20 Claims, 11 Drawing Sheets

(56) References Cited

U.S. PATENT DOCUMENTS

| | | | | |
|---|---|---|---|---|
| 2011/0318949 | A1 | 12/2011 | Adams | |
| 2016/0216453 | A1* | 7/2016 | Larkin | G02B 6/385 |
| 2018/0348446 | A1 | 12/2018 | Li et al. | |
| 2021/0247583 | A1 | 8/2021 | Elkins, II | |

FOREIGN PATENT DOCUMENTS

| | | | |
|---|---|---|---|
| CN | 217879729 | U | 11/2022 |
| CN | 218240472 | U | 1/2023 |
| DE | 102013211394 | A1 | 1/2014 |
| JP | 2002-139651 | A | 5/2002 |
| JP | 2005-070185 | A | 3/2005 |
| JP | 2006-039310 | A | 2/2006 |
| JP | 2007-286587 | A | 11/2007 |

* cited by examiner

| Common Trade Names | Acrylic (PMMA) | Polycarbonate (PC) | Polystyrene (PS) | Cyclic Olefin Copolymer (COC) | Cyclic Olefin Polymer (COP) | PolyEtherImide (PEI) | Thermo-plastic Polyimide | AL-6261 | AL-6263 |
|---|---|---|---|---|---|---|---|---|---|
| | LUCITE, PLEXIGLASS, POLYCAST | LEXAN, MERLON | DYLENE, STYRON, LUSTREX | TOPAS | ZEONEX, ZEONOR | ULTEM | EXTEM | OKP4 | OKP4HT |
| **Refractive Index:** $n_F$(486.1nm)<br>$n_d$ (587.6nm)<br>$n_D$ (589.3nm)<br>$n_C$ (656.3nm) | 1.498<br>1.492<br>1.492<br>1.489 | 1.599<br>1.585<br>1.585<br>1.580 | 1.604<br>1.590<br>1.590<br>1.585 | 1.540<br>1.534<br>1.534<br>1.531 | 1.537<br>-<br>1.530<br>1.527 | 1.689<br>-<br>1.682<br>1.653 | 1.685<br>1.660<br>-<br>1.650 | 1.623<br>1.607<br>1.607<br>1.601 | 1.653<br>1.632<br>1.632<br>1.625 |
| **Rate of Index change w/Temp**<br>$dn_{abs}/dT \times 10^{-5}$ /°C<br>**Abbe Value** ($V_d$) | -8.5<br>55 to 57 | -11.8 to -14.3<br>30 | -12<br>31 | -10.1<br>56 | -8<br>56 | -<br>19 | -9.1<br>19 | -13<br>27 | -11<br>23 |
| **Transmission %**<br>Visible Spectrum through 3.174mm | 92 | 85-91 | 87-92 | 92 | 92 | 36-82 | - | 85-92 | 85-92 |
| **ΔHaze (%)** | 0.5 to 2 | 1 to 2 | 2 to 3 | 1 to 2 | 1 to 2 | 2 | - | 1 | 1 |
| **CTE: Coeff. of Linear Exp.**<br>$\times 10^{-5}$ cm/cm/°C @ 70°C | 6.74 | 6.6 to 7.0 | 6.0 to 8.0 | 6.0 to 7.0 | 6.0 to 7.0 | 4.7 to 5.6 | 5.0 | 7.2 | 6.9 |
| **Max Continuous Service Temp**<br>$T_{10}^{13.0}$ | 140°F to 158°F<br>60°C to 70°C | 255°F<br>124°C | 180°F<br>82°C | 266°F<br>130°C | 266°F<br>130°C | 338°F<br>170°C | 446°F<br>230°C | -<br>- | -<br>- |
| **HDT: Heat Deflection Temp**<br>3.6°F/min @66psi [0.455MPa; annealed] | 214°F/101°C<br>VS-100 177°F | 295°F/146°C | 230°F/110°C | 266°F/130°C | 266°F/130°C | 410°F/210°C | 482°F/250°C<br>Unannealed | 222°F/106°C<br>@1.8 Mpa | 253°F /123°C<br>@1.8 Mpa |
| 3.6°F/min @264psi [1.82 Mpa; annealed] | 198°F/92°C<br>VS-100 169°F | 288°F/142°C | 180°F/82°C | 253°F/123°C | 263°F/123°C | 394°F/201°C | 455°F/235°C<br>Unannealed | - | - |
| **Specific Gravity**<br>[water @ 72.5°F] | 1.16 to 1.19 | 1.20 to 1.25 | 1.05 to 1.06 | 1.02 to 1.03 | 0.95 to 1.01 | 1.27 | 1.31 | 1.22 | 1.26 |
| **Hardness** | Rockwell M97 | Rockwell M70 | Rockwell M90 | Rockwell M89 | Rockwell M89 | Rockwell M109 | - | - | - |
| **Impact Strength**<br>Notched Izod @ 73°/23°C (ft-Lbs/in notch) | 0.3 to 0.5 | 12.0 to 17.0 | 0.35 | 0.5 | 0.5 | 0.6 | 0.8 | 0.75 | 1.24 |
| **Key Advantages** | Scratch Resistance<br>Chemical Resistance<br>High Abbe #<br>Excellent for Diamond Turning | Impact Strength<br>Temperature Resistance | Clarity<br>Low Cost | Low Moisture Absorption<br>High Modulus<br>Good Electrical Properties | Low Birefringence<br>Chemical Resistance<br>Completely Amorphous | Impact Resistance<br>Thermal Resistance<br>Chemical Resistance<br>High Index | High Fluidity<br>High Thermal Resistance<br>Chemical Resistance<br>Low Abbe # | High Index<br>Low Birefringence<br>Low Abbe #<br>High Fluidity | High Index<br>Low Birefringence<br>Low Abbe #<br>High Fluidity |

FIG. 5

LOOPBACK DUST CAP FOR FIBER OPTIC LINK ERROR DETECTION AND METHOD OF MAKING SAME

PRIORITY APPLICATION

This application claims the benefit of priority of U.S. Provisional Application No. 63/627,150, filed on Jan. 31, 2024, the content of which is relied upon and incorporated herein by reference in its entirety.

TECHNICAL FIELD

This disclosure relates generally to optical connectivity, and more particularly to a method and device for testing fiber optic cables.

BACKGROUND

Optical fibers are useful in a wide variety of applications, including the telecommunications industry for voice, video, and data transmissions. Benefits of optical fibers include wide bandwidth and low noise operation. Continued growth of the Internet has generated demand for data centers having larger numbers of computer systems and associated telecommunication and storage systems. These systems are often connected by one or more fiber optic cables that were installed well before the systems. If a fiber optic cable has excessive signal loss (e.g., due to unlatched or dirty connectors, a severely bent fiber, or any other reason) the systems connected by that fiber optic cable may not function properly. When a technician becomes aware of a problematic optical link, they must identify the fiber optic cable providing the link, track down each end of the fiber optic cable, and then test the fiber optic cable, e.g., using a power meter or installed hardware (e.g., switch) to determine if there is excessive signal loss.

In large data centers having thousands of fiber optic cables, finding and testing a fiber optic cable providing a defective link between network nodes can be time consuming. Thus, there is a need in the fiber optic industry for improved methods and devices for evaluating fiber optic cables prior to the cables being used to connect network nodes.

SUMMARY

In one aspect of the disclosure, a loopback dust cap is disclosed. The dust cap includes a body having a first cavity configured to receive first ferrule terminating a first optical fiber of a fiber optic cable, a second cavity configured to receive a second ferrule terminating a second optical fiber of the fiber optic cable, and one or more third cavities. At least one of the first cavity and the one or more third cavities define a first surface configured to reduce a divergence of an optical beam emitted by the first optical fiber, at least one of the second cavity and the one or more third cavities define a second surface configured to increase a convergence of the optical beam so that the optical beam is focused onto the second optical fiber, and the one or more third cavities define a plurality of surfaces including a third surface and a fourth surface configured to redirect the optical beam so that the optical beam is received by the second optical fiber.

In one embodiment of the dust cap, the first surface may define a first lens that faces an end-face of the first ferrule when the first ferrule is engaged with the first cavity, and the second surface may define a second lens that faces an end-face of the second ferrule when the second ferrule is engaged with the second cavity.

In another embodiment of the dust cap, the first surface may have one of a first curvature or a first metasurface that defines the first lens, and the second surface may have one of a second curvature or a second metasurface that defines the second lens.

In another embodiment of the dust cap, the first cavity may include a first stop that positions the first ferrule relative to the first surface so that a portion of the optical beam propagating between the third surface and the fourth surface is collimated, and the second cavity may include a second stop that positions the second ferrule relative to the second surface so that the optical beam is focused on the second optical fiber.

In another embodiment of the dust cap, the third surface and the fourth surface may each be defined by the same third cavity.

In another embodiment of the dust cap, the same third cavity may further define the first surface and the second surface, and each of the first cavity and the second cavity may include an open end that opens into the same third cavity.

In another embodiment of the dust cap, the optical beam may be redirected through total internal reflection at each of the third surface and the fourth surface.

In another embodiment of the dust cap, the third surface and the fourth surface may each include a reflective coating, and the optical beam may be redirected through external reflection by the reflective coating at each of the third surface and the fourth surface.

In another embodiment of the dust cap, the first cavity may define the first surface, and the second cavity may define the second surface.

In another embodiment of the dust cap, the third surface and the fourth surface may each include a curvature, the curvature of the third surface may reduce the divergence of the optical beam, the curvature of the fourth surface may increase the convergence of the optical beam, the first surface may collimate the optical beam emitted by the first optical fiber by further reducing the divergence of the optical beam, and the second surface may focus the optical beam onto the second optical fiber by further increasing the convergence of the optical beam.

In another embodiment of the dust cap, the curvature of the third surface may reduce the divergence of the optical beam along a first axis, the curvature of the fourth surface may increase the convergence of the optical beam along a second axis, the first surface may reduce the divergence of the optical beam along a third axis orthogonal to the first axis, and the second surface may increase the convergence of the optical beam along a fourth axis orthogonal to the second axis.

In another aspect of the disclosure, another loopback dust cap is disclosed. The dust cap includes a first cavity configured to receive the first ferrule, a second cavity configured to receive the second ferrule, and one or more third cavities that define a first surface and a second surface. The first surface is configured to redirect and to reduce the divergence of an optical beam emitted by the first optical fiber, and the second surface is configured to further redirect and to increase the convergence of the optical beam so that the optical beam is focused onto the second optical fiber.

In one embodiment of the dust cap, the first cavity may include the first stop that positions the first ferrule relative to the first surface so that the optical beam propagating between the first surface and the second surface is collimated by the first surface, and the second cavity may include the second stop that positions the second ferrule relative to the second surface so that the optical beam is focused on the second optical fiber by the second surface.

In another embodiment of the dust cap, the first surface and the second surface may each be defined by the same third cavity.

In another embodiment of the dust cap, each of the first cavity and the second cavity may include an open end that opens into the same third cavity.

In another embodiment of the dust cap, the optical beam may be redirected through total internal reflection at each of the first surface and the second surface.

In another embodiment of the dust cap, the first surface and the second surface each include a reflective coating, and the optical beam may be redirected and the divergence of the optical beam reduced through external reflection by the reflective coating at the first surface, and the optical beam may be further redirected and the convergence of the optical beam increased through external reflection by the reflective coating at the second surface.

In another aspect of the disclosure, a method of fabricating a loopback dust cap is disclosed. The method includes defining the first cavity configured to receive the first ferrule in a body of transparent material, defining the second cavity configured to receive the second ferrule in the body of transparent material, defining a plurality of surfaces in or on the body of transparent material configured to collimate the optical beam emitted by the first optical fiber, redirect the optical beam so that the optical beam is aligned with the second optical fiber, and focus the optical beam on the second optical fiber.

In one embodiment of the disclosed method, the first cavity may define a first surface of the plurality of surfaces, and the second cavity may define a second surface of the plurality of surfaces. The first surface may be configured to reduce the divergence of the optical beam emitted by the first optical fiber, and the second surface may be configured to increase the convergence of the optical beam so that the optical beam is focused onto the second optical fiber.

In another embodiment of the disclosed method, the plurality of surfaces may include the third surface and the fourth surface. The third surface may be configured to redirect the optical beam, and the fourth surface may be configured to further redirect the optical beam so that the optical beam is received by the second optical fiber.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 5 is a tabular view showing the properties of materials from which the end cap of FIGS. 1-4 may be fabricated.

DETAILED DESCRIPTION

Figure 1:
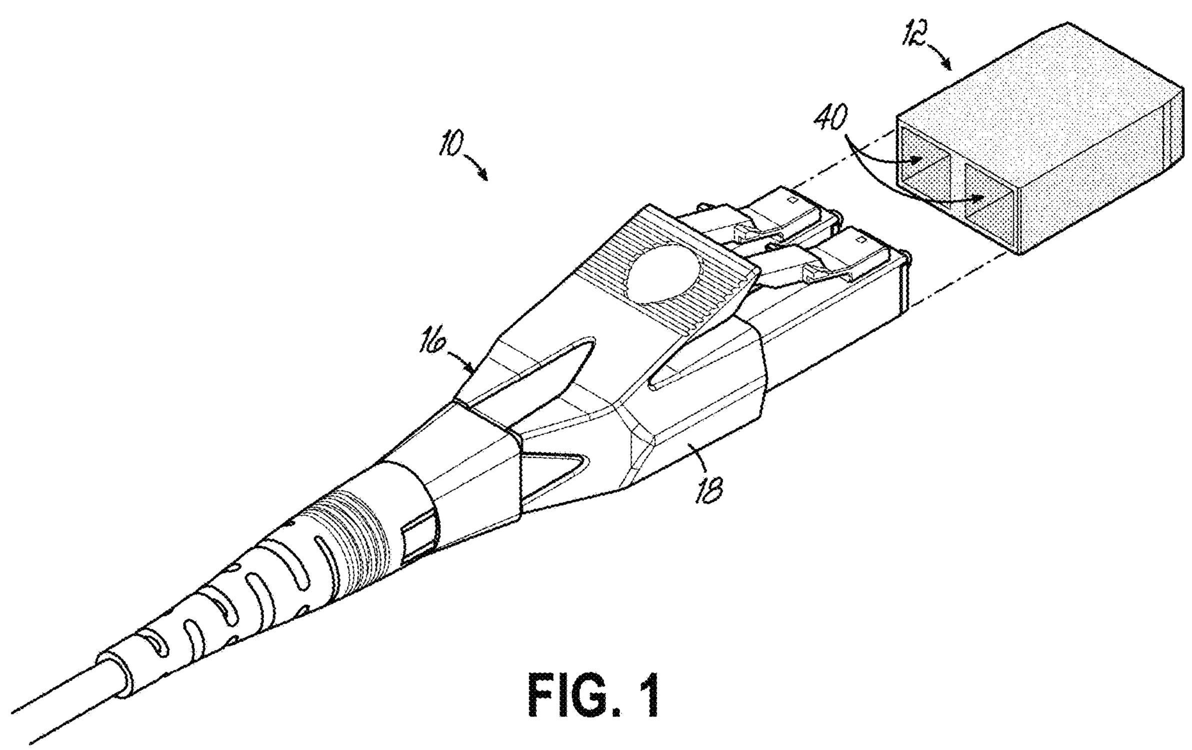
FIG. 1 is perspective view of an exemplary fiber optic connector and loopback dust cap in an unengaged condition.
Figure 2:
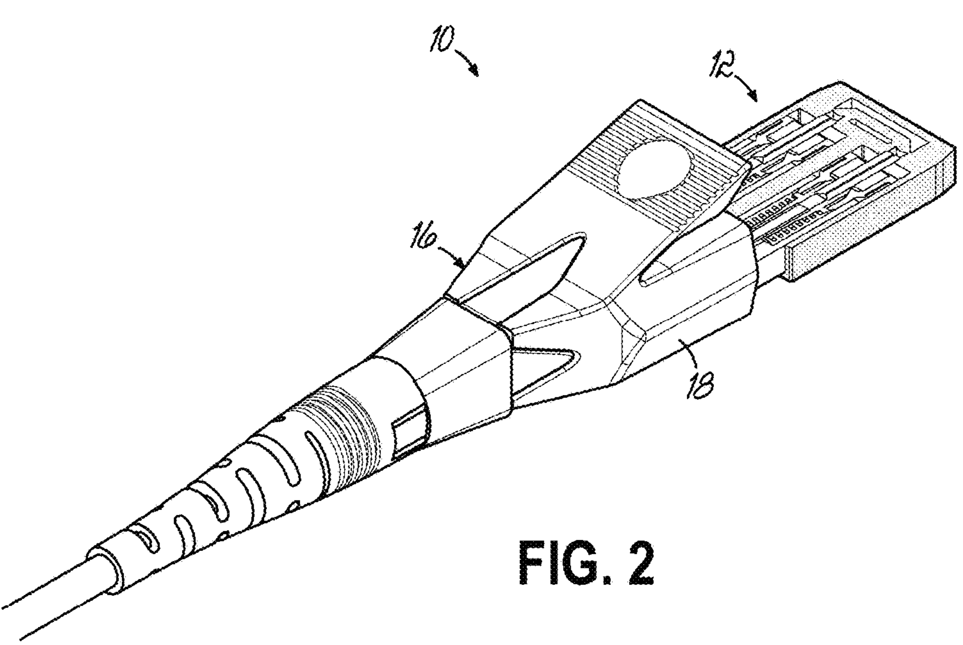
FIG. 2 is perspective view of the exemplary fiber optic connector and loopback dust cap of FIG. 1 in an engaged condition.

Various embodiments will be further clarified by examples in the description below. In general, the description relates to a loopback dust cap for a fiber optic cable that provides an optical loopback which can be used for testing the fiber optic cable. For example, the loopback dust cap may be configured to receive an optical signal (e.g., a 1300 nm optical signal) transmitted down one optical fiber and redirect the received optical signal down another optical fiber in the fiber optic cable to which the loopback dust cap is attached. The loopback dust cap may thereby provide a loopback to the device (e.g., transceiver) transmitting the optical signal.

The amount of attenuation in the loopback can be determined by comparing the amplitude of the return optical signal to the amplitude of the transmitted optical signal. Attenuation issues in the loopback optical link, such as may be caused by the presence of debris or loose connections, can then be identified based on the amount of attenuation. In one embodiment, the loopback dust cap may comprise a single part with molded optical elements that redirect the received signal. Metasurface features may also be placed on portions of the loopback dust cap instead of, or in addition to, the molded optical elements to focus and reflect the received optical signal so that it is transmitted from one optical fiber to another optical fiber.

Loopback dust caps and methods of using loopback dust caps to evaluate optical lines may be particularly useful in data center systems. Data centers often include duplex optical links in which optical signals are sent down one optical fiber and returned on another optical fiber. In this environment, loopback dust caps can be placed at one end of a duplex link and the return signal measured at the other end, e.g., at a transceiver. Data center optical links often include multiple jumpers, modules, trunk cables, and harnesses. When a loopback dust cap is installed at the end of a link, the loopback feature may facilitate determining the loss through that link. By comparing losses between links, a technician may identify an optical link having a higher-than-normal loss as having a problem. For example, if a relatively large number of optical links (e.g., 99 links) have a relatively low loss (e.g., a loss of less than 1.5 dB), and only a few optical links (e.g., one link) have a relatively high loss (e.g., a loss in excess of 4 dB), the links with the outlying attenuations likely have problems. The use of transparent or translucent materials in the body of the loopback dust cap may also facilitate link identification by enabling the dust cap to be illuminated with a visual fault locator. Loopback dust caps may also be configured to allow an A-B style molded body that includes core pins to form ferrule alignment features, thereby enabling low-cost manufacturing.

The body of a loopback dust cap may include one or more cavities each defining one or more surfaces. Each surface may be flat or curved or otherwise configured reflect and/or refract light incident on the surface in a predetermined way. Each surface may thereby define an optical element that modifies the direction of the rays of an optical beam incident on the surface. The one or more cavities of the loopback dust cap may thereby define one or more optical devices each including one or more optical elements that collectively modify an optical beam received from one optical fiber so that it is transmitted to another optical fiber.

An optical device that reduces the divergence (or increases the convergence) of an optical beam may be generally referred to as a collimator. The divergence of an optical beam may be decreased by modifying the direction of the rays of the optical beam so that they become more aligned with a specific direction, e.g., so that they become parallel or "collimated". The convergence of the optical beam may be increased by modifying the direction of the rays of the optical beam so that they converge, e.g., so that the optical beam becomes focused. Optical devices may also be configured to change the direction of propagation of an optical beam as a whole, e.g., by modifying the direction of the rays of the optical beam so that the center axis of the optical beam is oriented in a new direction. A device that changes the direction of (or "redirects") an optical beam may be generally referred to as a director. An optical device may be configured to collimate or focus an optical beam, redirect an optical beam, or both collimate/focus and redirect an optical beam. Optical devices may be configured to modify the rays of an optical beam in a desired way using ray tracing or any other suitable design technique. For example, optical devices having a desired set of characteristics may be designed on a computer running ray-tracing software.

Figure 3:
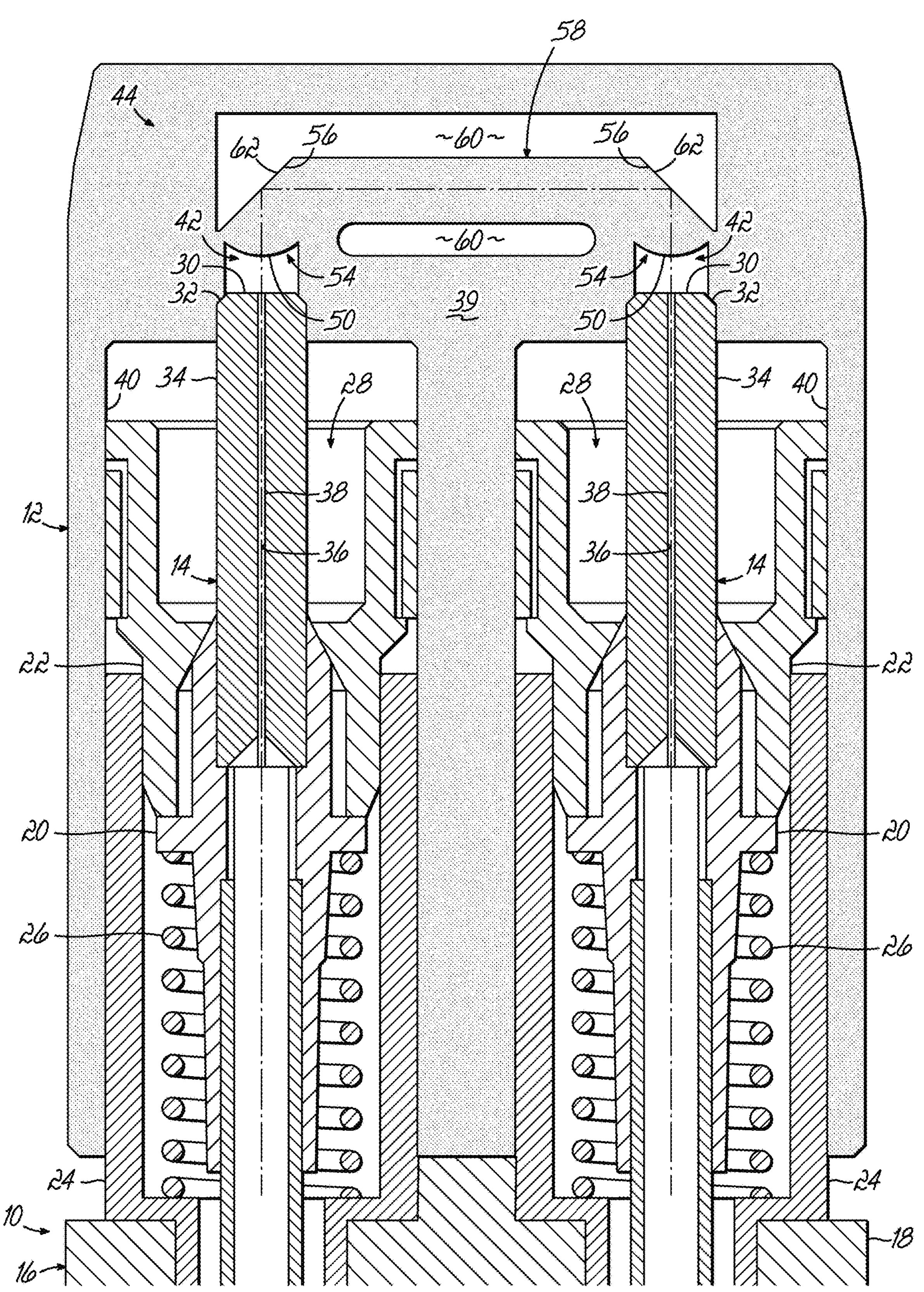
FIGS. 3 and 4 are cross-sectional views of the fiber optic connector loopback dust cap of FIG. 2.

FIGS. 1-4 depict exemplary embodiments of a duplex connector 10 and a loopback dust cap 12 configured to receive the connector 10. Although the connector 10 is shown in the form of a LC-type connector (e.g., according to IEC 61754-20:2012), the present disclosure may also apply to other connector types, including but not limited to MDC connectors available from US Conec Ltd. and SN connectors available from Senko Advanced Components, Inc. As best shown by FIG. 3, the connector 10 includes a plurality of ferrules 14 (e.g., two ferrules 14) and an outer assembly 16. The outer assembly 16 may include an outer housing 18 as well as a plurality of (e.g., two of each) ferrule holders 20, inner housings 22, connector bodies 24, and elastic members 26 (e.g., springs). Each inner housing 22 may include a cavity 28 having a back opening into which a respective ferrule 14 is inserted, and a front opening from which the respective ferrule 14 extends. The back opening of cavity 28 may define a rim that provides a seat. Although the inner housings 22 are separate components secured to a respective connector body 24, thereby providing a two-piece connector body, in alternative embodiments one-piece bodies may be provided that include inner geometry for interfacing with the ferrule holders 20.

Each ferrule 14 may include a front end-face 30, a front chamfer 32, a circumferential outer surface 34, and a micro-bore 36 configured to receive an optical fiber 38. The outer surface 34 may be cylindrically shaped as shown, or may have another suitable cross-sectional shape, such as a polygon. A front portion of each ferrule 14 may extend through the back opening and into the cavity 28, and a back portion of each ferrule may operatively couple the ferrule 14 to a respective ferrule holder 20.

Each elastic member 26 may include a front end that is operatively coupled to the ferrule holder 20 and a back end that is operatively coupled to the connector body 24. The front and back ends of elastic member 26 may apply force in opposing directions against the ferrule holder 20 and connector body 24. Absent any opposing longitudinal force being applied to the ferrule 14, the force applied by the elastic member 26 may urge the ferrule holder 20 toward the inner housing 22 so that a front edge of ferrule holder 20 abuts the seat defined by the back opening of cavity 28. When sufficient longitudinal force is applied to the ferrule 14 to overcome the force provided by the elastic member 26 (such as when the connector 10 is inserted into the loopback dust cap 12), the ferrule 14 may urge the ferrule holder 20 backward, further compressing the elastic member 26. The elastic member 26 may thereby maintain the front end-face 30 and/or chamfer 32 of ferrule 14 in close contact with a portion of the loopback dust cap 12 with which the connector 10 is engaged.

The loopback dust cap 12 may include a body 39, one or more connector cavities 40 (e.g., two cavities) configured to receive the connector 10, one or more ferrule cavities 42 (e.g., two cavities) each configured to receive a respective ferrule 14 of connector 10, and an optical coupler 44 configured to operatively couple optical signals between the optical fibers 38. Suitable transparent materials from which the body 39 of loopback dust cap 12 may be fabricated include, but are not limited to, polymethyl methacrylate (e.g., LUCITE, PLEXIGLASS, POLYCAST), polycarbonate (e.g., LEXAN, MERLON), polystyrene (e.g., STYRON, LUSTREX), cyclic olefin colpolymer (e.g., TOPAS), polyetherimide (e.g., ZEONEX, ZEONOR), crown glass, and flint glass. The one or more connector cavities 40 may be sized and shaped so as to provide a friction-fit with the connector 10.

Each ferrule cavity 42 may include a front portion 46, a rear portion 48, and a rear surface 50. The front portion 46 of the ferrule cavity 42 may be configured to receive a ferrule 14, and the rear portion 48 of the ferrule cavity 42 may be configured to provide a stop 52. The stop 52 may comprise one or more of a chamfer (shown), a ring, or any other feature that engages one or both of the front end-face 30 and the front chamfer 32 of ferrule 14. The stop 52 may be positioned within the ferrule cavity 42 so that when the ferrule 14 is seated on the stop 52, the front end-face 30 of the ferrule 14 is positioned at a predetermined distance $d_1$ from the rear surface 50 of ferrule cavity 42.

The optical coupler 44 of loopback dust cap 12 may include one or more lenses 54 (e.g., two lenses 54), one or more reflectors 56 (e.g., two reflectors 56), an optical guide 58, and one or more optical cavities 60. Each lens 54 may be defined by the rear surface 50 of ferrule cavity 42, e.g., using a curved rear surface 50 (e.g., a spherical, elliptical, parabolic, or hyperbolic surface—as shown) and/or other suitable structures (e.g., a Fresnel lens or metasurface) that provides the lens 54 with a predetermined focal length $f_L$. Each lens 54 of optical coupler 44 may thereby function as a collimator.

Each reflector 56 of optical coupler 44 may include a surface 62 defined by an optical cavity 60 of loopback dust cap 12. Each optical cavity 60 may contain a gas (e.g., air, nitrogen, argon, etc.) or some other suitable medium (e.g., a vacuum, oil, etc.) having an index of refraction sufficiently different from the body 39 of loopback dust cap 12 to form a reflective interface. The optical guide 58 may likewise be provided by one or more surfaces that define a reflective interface, e.g., a cylindrical surface between the body 39 of loopback dust cap 12 and one or more optical cavities 60.

The body 39 of loopback dust cap 12 may be fabricated, for example, using injection molding. With injection molded loopback dust caps 12, the lenses 54, reflectors 56, and optical guide 58 that operatively couple optical signals between optical fibers 38 may be formed from the same material as the body 39 of loopback dust cap 12. A single piece molded plastic body 39 may provide a low-cost loopback dust cap 12 as a single part that does not require assembly or alignment of individual optical components.

Figure 4:
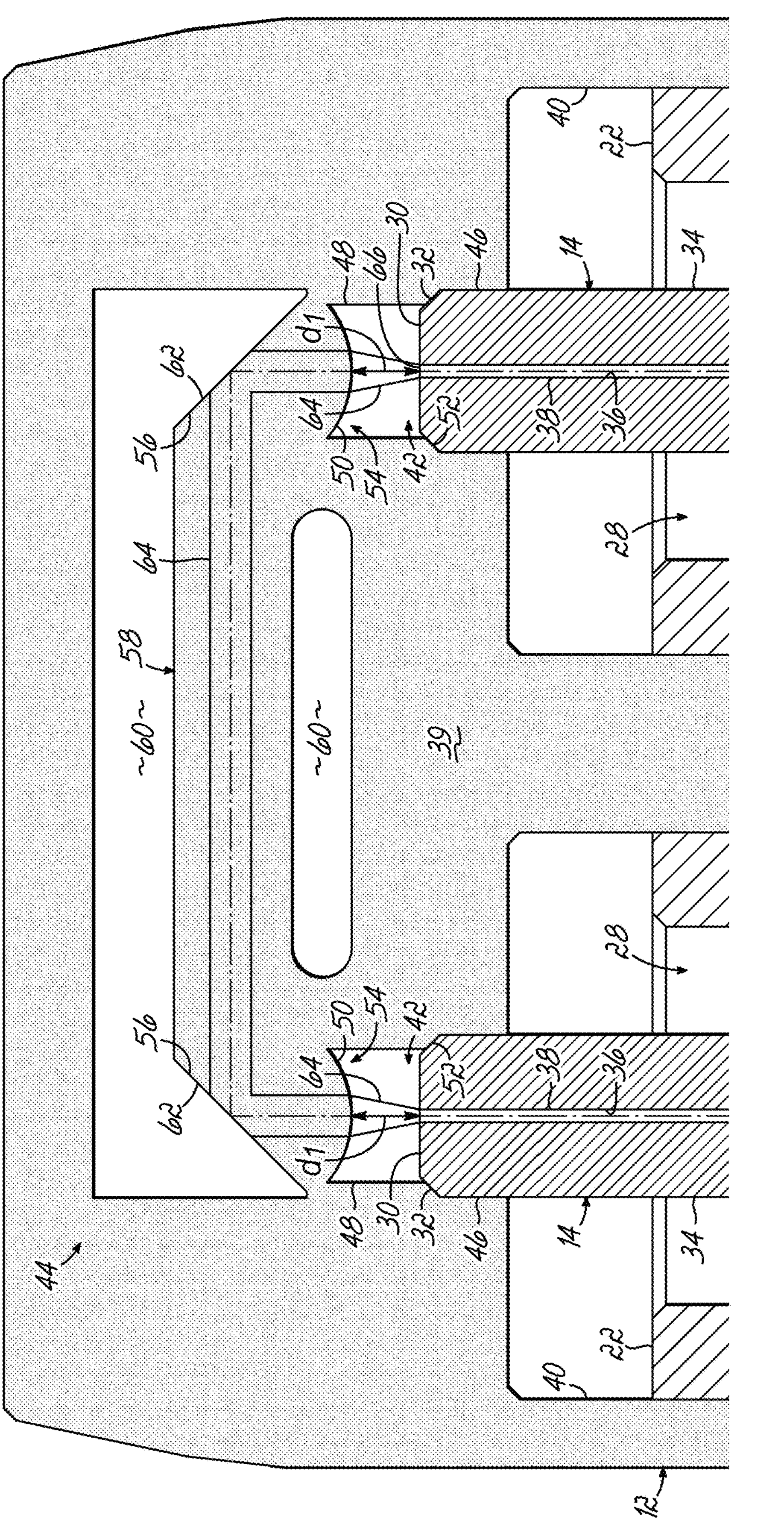

As best shown by FIG. 4, the optical coupler 44 may be configured to transmit optical signals between optical fibers 38 using a combination of refraction (e.g., by lens 54) and total internal reflection (e.g., by reflectors 56). Total internal reflection occurs when the angle of incidence at the interface between the internal medium (e.g., the body 39 of loopback dust cap 12) and the external medium (e.g., the cavities 60 of loopback dust cap 12) is greater than a critical angle $\theta_c$. The critical angle $\theta_c$ is provided by:

$$\theta_c = \arcsin\frac{n_e}{n_i} \qquad \text{Eqn. 1}$$

where $n_e$ is the index of refraction of the external medium (e.g., air), $n_i$ is the index of refraction for the internal medium (e.g., glass or polymer), and $n_i > n_e$. For an interface between polycarbonate ($n_i=1.58$) and air ($n_e=1.00$), the critical angle $\theta_c \approx 39$ degrees. Thus, light having an angle of incidence of 45 degrees at a polycarbonate/air interface would be subject to total internal reflection.

An optical signal propagating through an optical fiber 38 is normally confined by the dielectric properties of the core and cladding thereof. When the optical signal emerges from the transmitting optical fiber 38 and into the rear portion 48 of ferrule cavity 42, the light is no longer confined. Thus, the optical beam 64 emitted from the optical fiber 38 diverges according to the laws of diffraction. This expanding optical beam 64 may be received by what is referred to herein as the "proximal" lens 54. In describing the optical coupler 44, various optical elements (e.g., lenses 54 and reflectors 56) may be referred to herein as "proximal" or "distal" in relation to the direction of propagation of the optical beam 64. However, it should be understood that each optical fiber 38 can be a transmitting optical fiber 38 or a receiving optical fiber 38. Thus, the use of the terms "proximal" and "distal" may be somewhat arbitrary.

The ferrule cavity 42 may align the ferrules 14 laterally with and position the ferrules 14 at the predetermined distance $d_1$ from each lens 54 to control the width of the optical beam 64 at the lens 54. The focal length fr of each lens 54 and each distance $d_1$ may be selected so that the proximal lens 54 transforms the expanding optical beam 64 into a fully or partially collimated optical beam 64, and the distal lens 54 transforms the collimated optical beam 64 into a converging optical beam 64 that is focused onto the receiving optical fiber 38.

The collimated optical beam 64 may be reflected into the optical guide 58 by the proximal reflector 56. The optical guide 58 may operatively couple the optical beam 64 to the distal reflector 56. The distal reflector 56 may then reflect the optical beam 64 into the distal lens 54. The distal lens 54 may focus the optical beam 64 onto the end-face 66 of receiving optical fiber 38 so that at least a portion of the optical beam 64 is coupled into the core region thereof.

As shown by FIG. 5, commonly available polymers, such as the aforementioned polymethyl methacrylate, polycarbonate, polystyrene, cyclic olefin colpolymer, and polyetherimide, have similar optical properties as crown or flint glass. It should be understood, however, that the exemplary materials described above are only a sample of the available materials that may have suitable optical properties for use in the loopback dust caps 12 described herein. Thus, it should be understood that other materials having suitable optical properties could also be used, and embodiments of the loopback dust cap 12 are thus not limited to any of the specific materials described.

For a typical connector 10, the optical path through optical coupler 44 may have a length on the order of about 7 mm. Accordingly, transmission losses due to propagation through the body 39 of loopback dust cap 12 should be negligible. Thus, losses in the optical coupler 44 may be caused primarily by reflections at transmission surfaces, e.g., at each lens 54. Assuming losses due to reflections of about 4% at each transmission surface, the resulting coefficient of transmission for the optical coupler 44 would be about 90%, which corresponds to a signal loss of about 0.45 dB. Anti-reflection coatings may be used to reduce losses (e.g., to below 0.2%) at one or more of the transmission surfaces, which could reduce signal losses to less than 0.02 dB. In most applications, a total signal loss of about 5 dB should be acceptable, in which case the margin for the coupling loss would be about 4.55 dB without anti-reflection coatings and about 4.98 dB with anti-reflection coatings.

Focusing the optical beam 64 tightly onto the receiving optical fiber 38 may improve coupling of the optical beam 64 into the receiving optical fiber 38. Thus, designing the optical coupler 44 so that it provides a tightly focused optical beam 64 at the end-face 66 of receiving optical fiber 38 may minimize signal loss. However, a tightly focused optical beam 64 may also require tight tolerances with regard to lateral positioning so that the focal point of optical beam 64 is aligned with the core region of the receiving optical fiber 38. Thus, there may be a balance between beam diameter (which may depend at least in part on axial tolerances) and alignment (which may depend at least in part on lateral tolerances).

Figure 6:
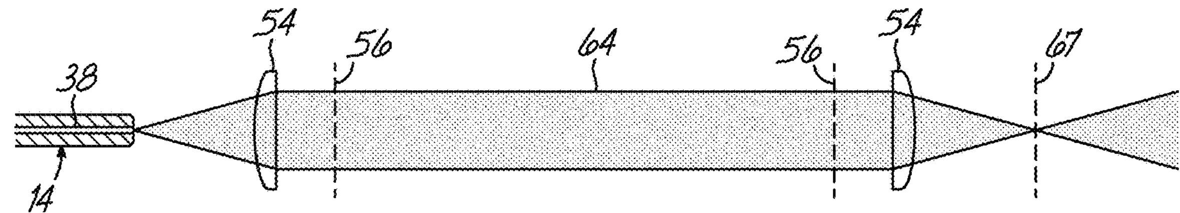
FIG. 6 is a diagrammatic view of an optical beam propagating along an optical path provided by an optical coupler of the loopback dust cap of FIGS. 1-4.

FIG. 6 presents a schematic depiction of the optical path of the optical beam 64 as it propagates through an exemplary optical coupler 44. As described above, the optical beam 64 begins expanding as soon as it emerges from the transmitting optical fiber 38. In the depicted example, the proximal lens 54 collimates the expanded optical beam 64, thereby transforming the optical beam 64 into a collimated optical beam 64 and minimizing any further expansion thereof. The collimated optical beam 64 may be redirected by total internal reflection at each of the reflectors 56, and thereby directed to the distal lens 54. The distal lens 54 may then focus the optical beam 64 onto a focal plane 67. Signal loss may be minimized when the end-face 66 of receiving optical fiber 38 is axially aligned with the focal plane 67, and the optical beam 64 is laterally aligned with the core region of the receiving optical fiber 38.

Figure 7:
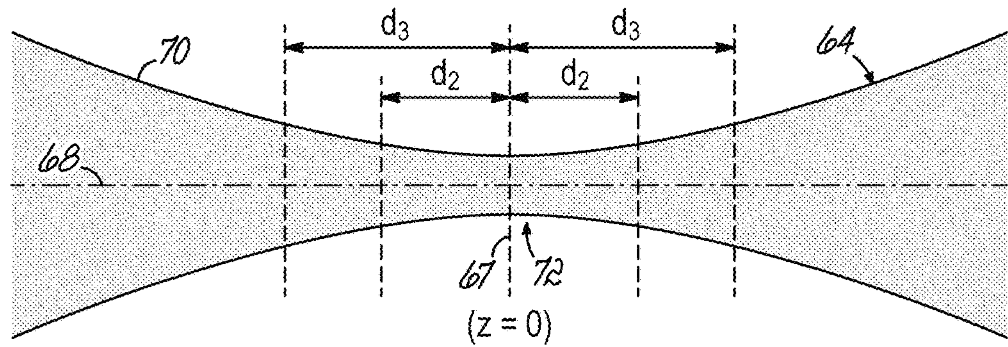
FIG. 7 is a diagrammatic view of a portion of the optical beam of FIG. 6 depicting a beam waist.

FIG. 7 depicts a detailed cross-sectional view of the optical beam 64 proximate to the focal plane 67. The optical beam 64 may be modeled as a Gaussian beam having a beam axis 68 (or "z-axis") along which the width of the optical beam 64 varies. An outer surface 70 of optical beam 64 may be defined as the point at which the intensity of the optical beam 64 has dropped to a predetermined value, e.g., $1/e^2$ of its on-axis value. The narrowest point of the optical beam 64 may be referred to as the beam waist 72, and is coincident with the location of the focal plane 67, e.g., at z=0. The radius w (z) of the optical beam 64 may increase with distance from the beam waist 72 according to the following hyperbolic expression:

$$w(z) = w_0\sqrt{1+\left(\frac{z}{z_R}\right)^2} \quad \text{Eqn. 2}$$

where $w_0$ is the radius of the optical beam 64 at z=0, and $z_R$ is a parameter known as the "Raleigh range". The Raleigh range is provided by:

$$z_R = \frac{\pi \times n}{\lambda} \times w_0^2 \quad \text{Eqn. 3}$$

where λ is the free-space wavelength of the light comprising the optical beam 64, and n is the index of refraction of the medium through which the optical beam 64 is propagating, e.g., n=1.00 for propagation through air.

Figure 8:
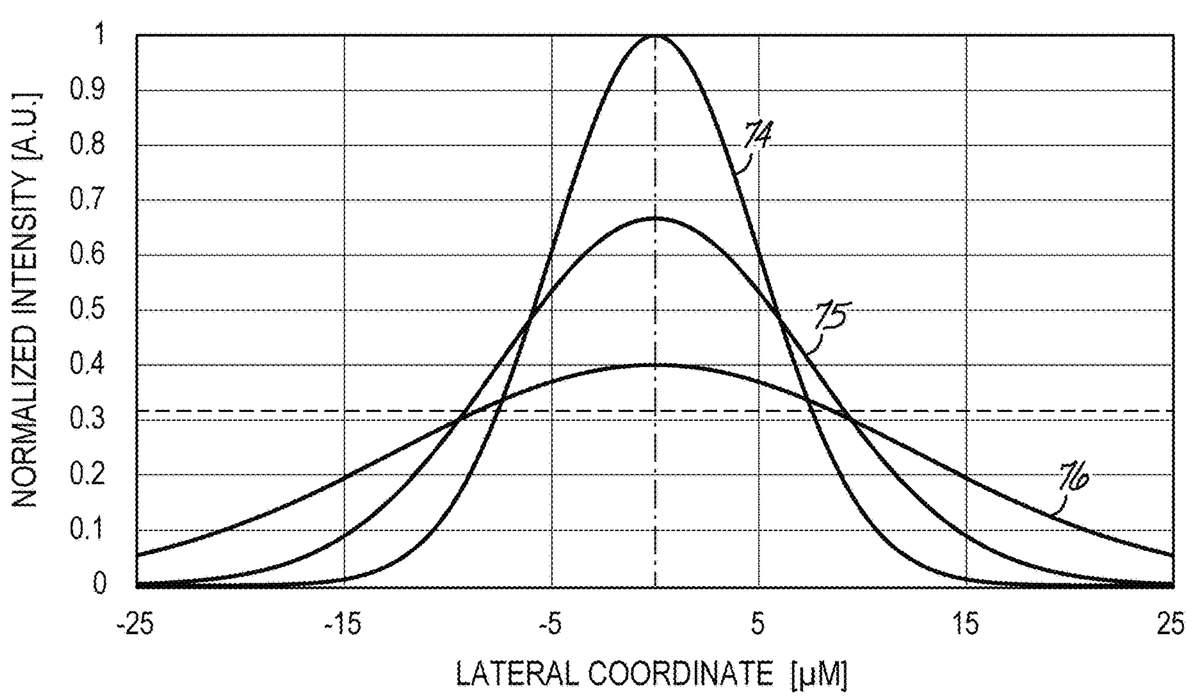
FIG. 8 is a graphical view of intensity versus radial position for the optical beam of FIG. 7 at each of several axial distances from the beam waist.

FIG. 8 depicts exemplary intensities of the optical beam 64 versus radial distance from the beam axis 68 at several different distances from the focal plane 67, e.g., z=0, $z=\pm d_2$, and $z=\pm d_3$. Specifically, plot 74 shows the intensity versus radial distance from the beam axis 68 at the focal plane 67, plot 75 shows the intensity versus radial distance from the beam axis 68 at an axial distance $d_2$ from the focal plane 67, and plot 76 shows the intensity versus radial distance from the beam axis 68 at an axial distance ds from the focal plane 67. As can be seen from graphs 74-76, as the coupling plane is moved away from the focal plane 67, the intensity distribution becomes wider, and the peak intensity drops. A wider intensity distribution may tend to relax the lateral alignment tolerance for the receiving optical fiber 38. In contrast, a lower peak intensity may tend to tighten the lateral alignment tolerance. Thus, there may be an optimum intensity distribution, and this distribution may depend at least in part on the tolerances of the loopback dust cap 12. The optimum intensity distribution for a given maximum allowable signal loss and set of dust cap tolerances may be found through numerical simulations.

Figure 9:
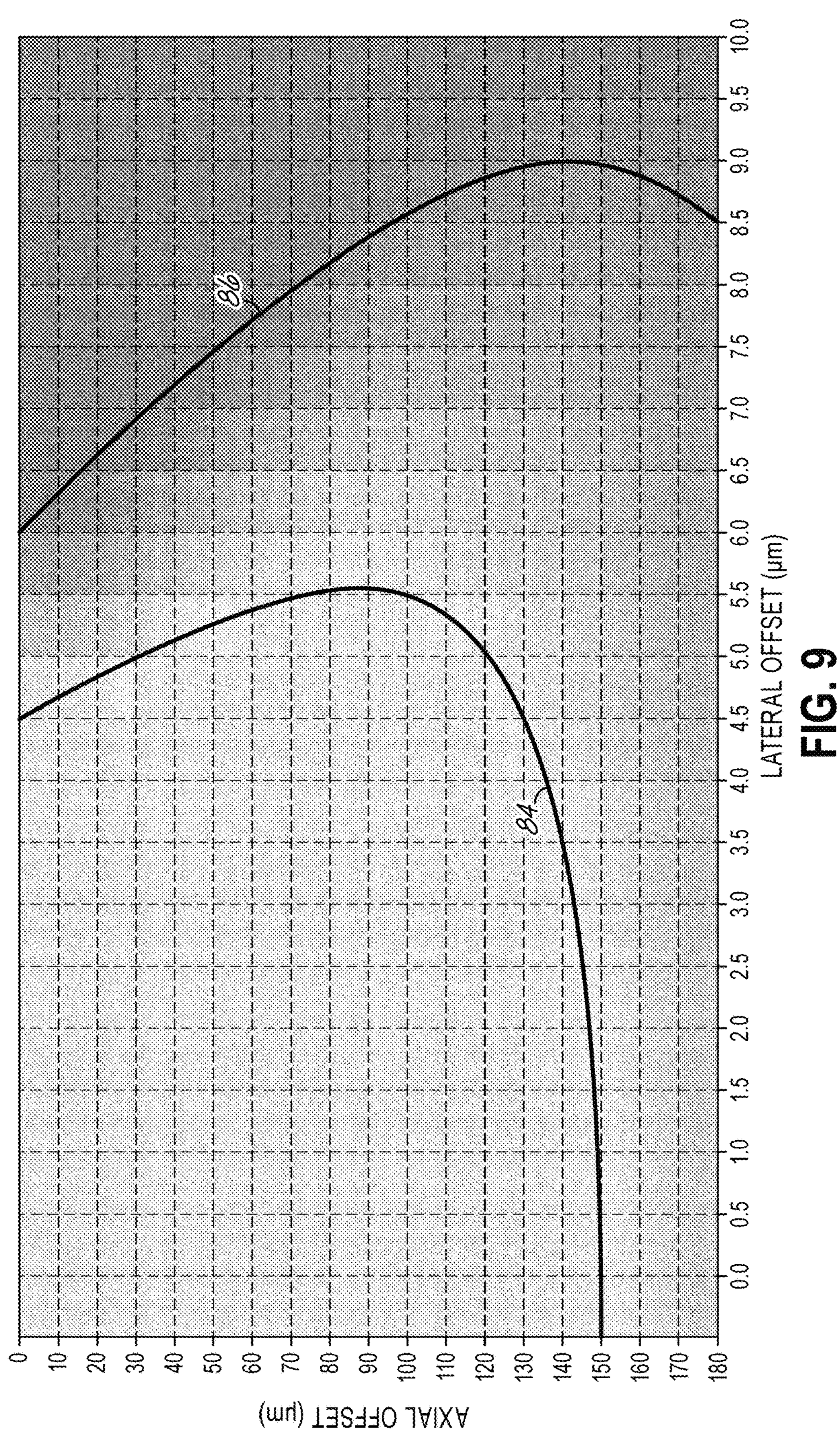
FIG. 9 is a graphical view of signal loss verses axial and lateral offset of the optical beam of FIG. 7 for the optical coupler of FIGS. 1-4 without antireflection coatings.
Figure 10:
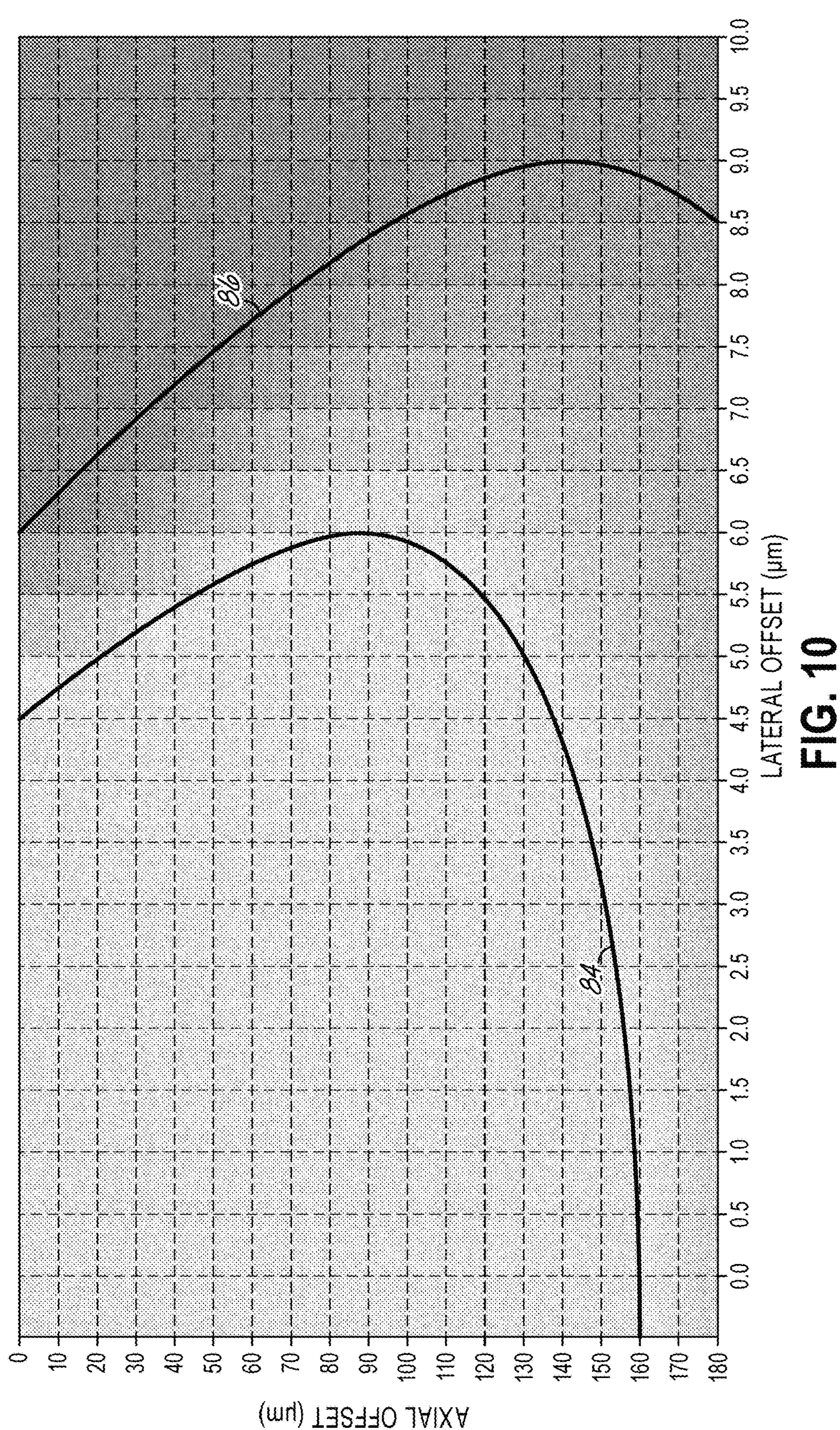
FIG. 10 is a graphical view of signal loss verses axial and lateral offset of the optical beam of FIG. 7 for the optical coupler of FIGS. 1-4 with antireflection coatings.

FIGS. 9 and 10 depict contour plots 80, 82 showing exemplary signal losses versus lateral and axial offsets for an optical coupler having transmission surfaces without anti-reflection coatings (FIG. 9) and with anti-reflection coatings (FIG. 10). Contour line 84 of each plot 80, 82 indicates a loss of 5.0 dB, and contour line 86 of each plot 80, 82 indicates a loss of 8.0 dB. The plots 80, 82 show that a signal loss of less than 5.0 dB may be obtained with a lateral tolerance in a range of +/−5 μm and an axial tolerance in a range of +/−140 μm. Each of these tolerances can be achieved with injection molded parts. Additional demands on the tolerances may result based on the accuracy of the lenses and internal reflection surfaces.

Figure 11:
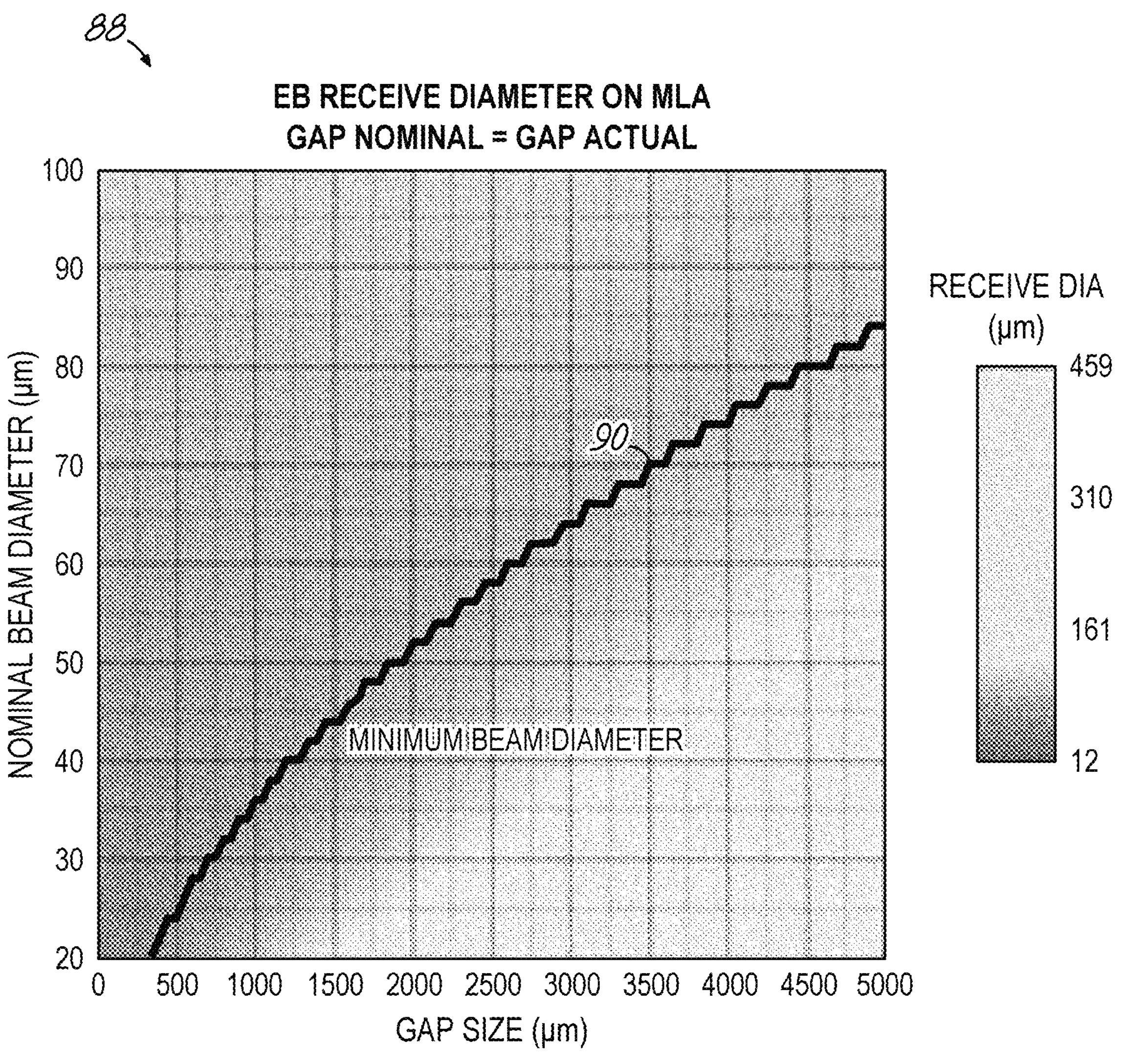
FIG. 11 is a graphical view of beam diameter versus distance for optical beams having various nominal beam diameters.

FIG. 11 depicts a contour plot 88 in which the gray-scale shading indicates the diameter of an optical beam versus distance z ("gap size") and nominal beam diameter (beam diameter at z=0). Line 90 of plot 88 shows the minimum possible received beam diameter at each distance and nominal beam size. As can be seen, a collimated beam diameter of 100 μm is well above the minimum beam diameter for all nominal beam diameters and optical path lengths depicted.

An optimum lateral tolerance of about 6 μm may be obtained for an axial offset of about 80 μm for embodiments of the loopback dust cap 12 that lack antireflection coatings on the lenses 54. In contrast, an optimum lateral tolerance of about 6 μm may be obtained for an axial offset of about 85 μm for embodiments of the loopback dust cap 12 that include antireflective coatings on the lenses 54. This difference in optimum lateral tolerance may be due to an asymmetry of the coupling as function of the axial offset. Due to the expanded beam between the two lenses 54, the offset may be distributed between the transmitting and the receiving optical fibers 38. Thus, a predetermined axial offset (e.g., of about 80 μm) may be built into the loopback dust cap 12 to maximize lateral tolerance. The exact geometry of the expanded optical beam 64 may vary so as long as the beam width is sufficient to negate diffractive effects along the propagation path. By way of example, for an optical path length of about 7 mm, a minimum beam diameter of 100 μm may be sufficient.

Figure 12:
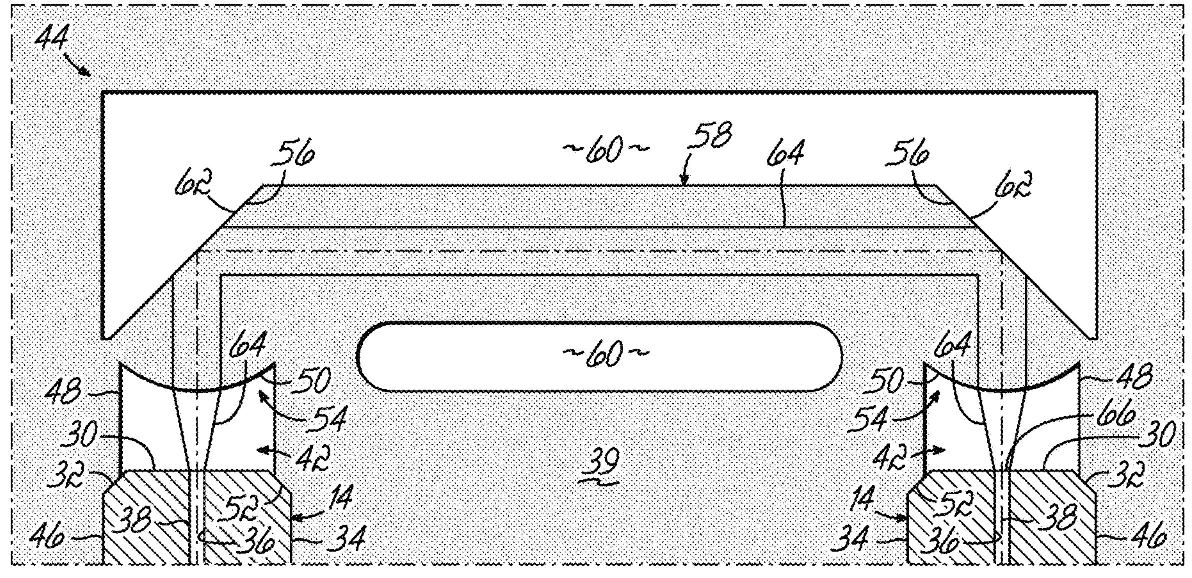
FIGS. 12-15 are diagrammatic views of exemplary alternative embodiments of the optical coupler of FIGS. 1-4.

FIG. 12 depicts the optical coupler 44 of FIG. 4, and shows the proximal lens 54 collimating the expanding optical beam 64 emitted from the transmitting optical fiber 38. The proximal reflector 56 then reflects the collimated optical beam 64 (e.g., through total internal reflection) by a predetermined angle (e.g., 90 degrees) into the optical guide 58. The optical guide 58 operatively couples the reflected collimated optical beam 64 to the distal reflector 56. The distal reflector 56 then reflects the collimated optical beam 64 (e.g., through total internal reflection) by another predetermined angle (e.g., 90 degrees) to the distal lens 54. The distal lens 54 then focuses the optical beam 64 on the core region of receiving optical fiber 38.

Figure 13:
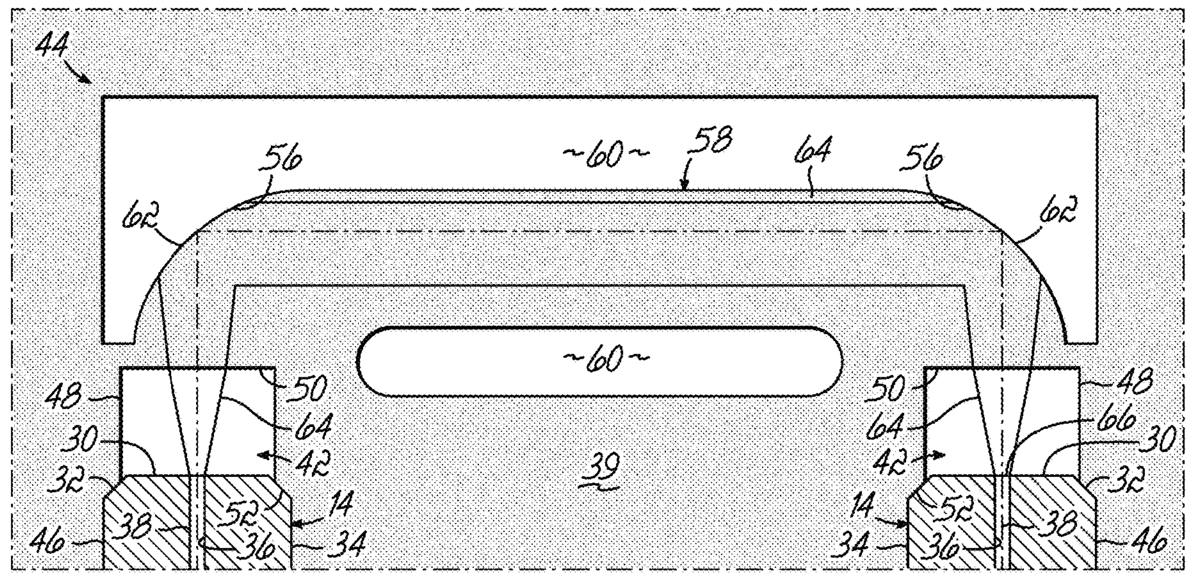

FIG. 13 depicts an alternative embodiment of the optical coupler 44 in which the rear surface 50 of each ferrule cavity 42 is planar, and each reflector 56 has a curved (e.g., spherical, elliptical, parabolic, or hyperbolic) surface. In this embodiment, the expanding optical beam 64 emitted from the transmitting optical fiber 38 may be uncollimated when it encounters the proximal reflector 56. The curvature of proximal reflector 56 may be configured to change the direction of each ray of expanding optical beam 64 so that the proximal reflector 56 both collimates and redirects the expanding optical beam 64. The optical guide 58 may then operatively couple the reflected collimated optical beam 64 to the distal reflector 56. The distal reflector 56 may then reflect the optical beam 64 by another predetermined angle (e.g., 90 degrees) and focus the optical beam 64 on the core region of the receiving optical fiber 38.

Figure 14:
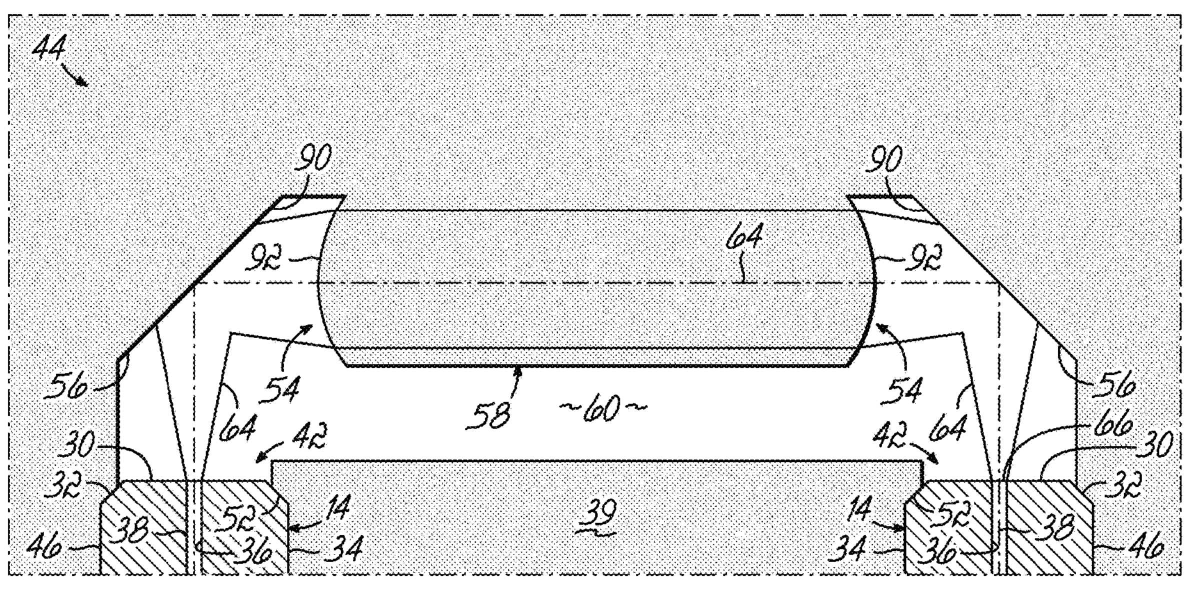

FIG. 14 depicts another alternative embodiment of the optical coupler 44. In this embodiment, each ferrule cavity 42 opens into a common optical cavity 60, and each reflector 56 includes a front surface mirror 90. The front surface mirror 90 may include a reflective coating made of one or more materials that enhance reflection, such as aluminum, silver, gold, and/or one or more dielectric layers. In the depicted embodiment, the optical guide 58 includes proximal and distal surfaces 92 each configured to provide a lens 54. The proximal reflector 56 reflects the expanding optical beam 64 received from the transmitting optical fiber 38 onto the proximal lens 54 of optical guide 58. The proximal lens 54 then transforms the expanding optical beam 64 into a collimated optical beam 64. The collimated optical beam 64 propagates through the optical guide 58 until it encounters the distal lens 54. The distal lens 54 then focuses the collimated optical beam 64. The converging optical beam 64 may then be reflected onto the core region of receiving optical fiber 38 by the distal reflector 56 of optical coupler 44.

Figure 15:
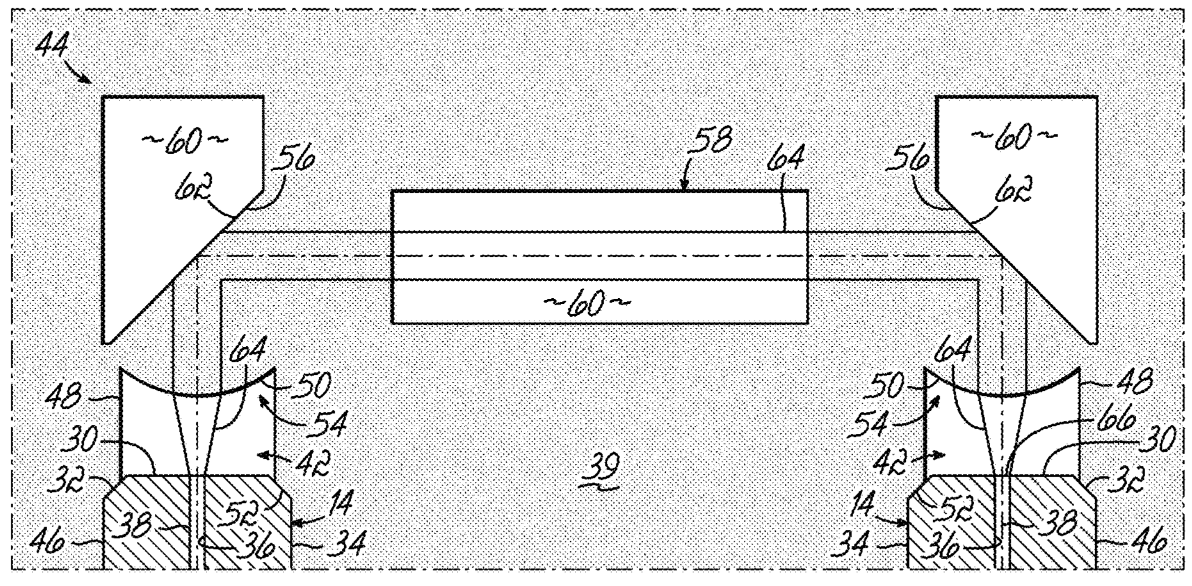

FIG. 15 depicts yet another alternative embodiment of the optical coupler 44. In this embodiment, the optical guide 58 is provided by a cavity 60 aligned with and positioned between the proximal and distal reflectors 56. In operation, the collimated optical beam 64 reflected from the proximal reflector 56 passes through the cavity 60 defining the optical guide 58. Otherwise, operation of the optical coupler 44 depicted by FIG. 14 is similar to that described above with respect to the optical coupler 44 of FIG. 12.

FIGS. 12-15 demonstrate that the arrangement of lenses 54 and/or reflectors 56 can vary so long as they collectively define an optical path that operatively couples the optical beam 64 from the transmitting optical fiber 38 to the receiving optical fiber 38. Collimation and focusing of the optical beam 64 may be provided by refractive surfaces (e.g., lenses 54), reflective surfaces (e.g., reflectors 56), or a combination of refractive and reflective surfaces. The optical path between the transmitting and receiving optical fibers 38 may be defined by the relative positions and configurations of the optical elements (e.g., lenses 54, reflectors 56, and optical guides 58) of the optical coupler 44. Each optical element may use one or more of total internal reflection, surface reflection, refraction, and propagation of the optical beam in air or the material comprising the body 39 of loopback dust cap 12 to perform its function.

The optical coupler 44 may include any number of optical elements each defined by one or more refractive and/or reflective surfaces and/or optical mediums that operate cooperatively to couple optical beams 64 between the transmitting and receiving optical fibers 38. For example, although the exemplary optical couplers 44 are depicted in FIGS. 12-15 as having two reflectors 56 each configured to redirect the optical beam 64 by 90 degrees, other numbers of reflectors 56 may also be used. Thus, the optical coupler 44 could include three reflectors 56 each configured to redirect the optical beam 64 by 60 degrees. Spreading the total amount of redirection over more than two reflectors 56 may increase the angle of incidence at each surface 62, thereby enabling the use of total internal reflection with materials having lower indexes of refraction $n_i$ and thus larger critical angles $\theta_c$.

In other embodiments, collimation may be performed in multiple steps, e.g., by using a pair of cylindrical lenses or reflectors on each side of the optical path. For example, cylindrical lenses oriented at a reference angle could be provided on the fiber side of each reflector 56 (e.g., by the rear surface 50 of each ferrule cavity 42) and additional cylindrical lenes at an angle offset 90 degrees from the reference angle at each surface 92 of optical guide 58. In another embodiment, one of the cylindrical lenses in the previous example could be replaced by a reflector 56 having a cylindrical reflective surface (internal or external). In yet another embodiment, multiple refractive surfaces could be used, with each lens sequentially decreasing the divergence of the expanding optical beam 64 until it is transformed into the collimated optical beam 64.

Figure 16:
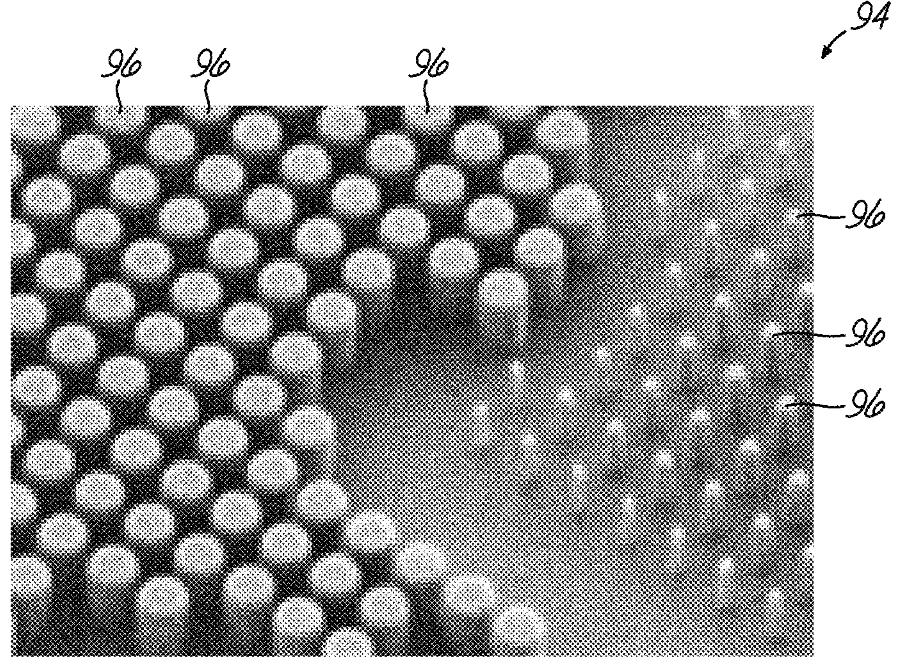
FIG. 16 is a perspective microscopic view of an exemplary metasurface that may be used to modify the optical beam in any of the optical couplers of FIGS. 1-4 and 12-15.

One or more of lenses of optical coupler 44 may also be provided by a metasurface. FIG. 16 depicts an exemplary metasurface 94 including a plurality of sub-wavelength structures known as "nanopillars" 96 that manipulate light passing through the metasurface 94. Metasurfaces may be written on wafers using semi-conductor fabrication techniques and then applied to a planar surface in the loopback dust cap 12, such as the rear surface 50 of ferrule cavity 42. Metasurfaces may be used to focus and defocus light, and may eliminate the need to mold precision lenes into the body 39 of loopback dust cap 12. Metasurfaces may be fabricated separately from the loopback dust cap 12, then attached to any suitable surface inside the loopback dust cap 12.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A loopback dust cap for a fiber optic cable including a first optical fiber terminated by a first ferrule and a second optical fiber terminated by a second ferrule, comprising:

a body including a first cavity configured to receive the first ferrule, a second cavity configured to receive the second ferrule, and one or more third cavities, wherein at least one of the first cavity and the one or more third cavities define a first surface configured to reduce a divergence of an optical beam emitted by the first optical fiber, at least one of the second cavity and the one or more third cavities define a second surface configured to increase a convergence of the optical beam so that the optical beam is focused onto the second optical fiber, and the one or more third cavities define a plurality of surfaces including a third surface and a fourth surface configured to redirect the optical beam so that the optical beam is received by the second optical fiber.

2. The dust cap of claim 1, wherein the first surface defines a first lens that faces an end-face of the first ferrule when the first ferrule is engaged with the first cavity, and the second surface defines a second lens that faces an end-face of the second ferrule when the second ferrule is engaged with the second cavity.

3. The dust cap of claim 2, wherein the first surface has one of a first curvature or a first metasurface that defines the first lens, and the second surface has one of a second curvature or a second metasurface that defines the second lens.

4. The dust cap of claim 1, wherein the first cavity includes a first stop that positions the first ferrule relative to the first surface so that a portion of the optical beam propagating between the third surface and the fourth surface is collimated, and the second cavity includes a second stop that positions the second ferrule relative to the second surface so that the optical beam is focused on the second optical fiber.

5. The dust cap of claim 1, wherein the third surface and the fourth surface are each defined by the same third cavity.

6. The dust cap of claim 5, wherein the same third cavity further defines the first surface and the second surface, and each of the first cavity and the second cavity includes an open end that opens into the same third cavity.

7. The dust cap of claim 1, wherein the optical beam is redirected through total internal reflection at each of the third surface and the fourth surface.

8. The dust cap of claim 1, wherein the third surface and the fourth surface each include a reflective coating, and the optical beam is redirected through external reflection by the reflective coating at each of the third surface and the fourth surface.

9. The dust cap of claim 1, wherein the first cavity defines the first surface, and the second cavity defines the second surface.

10. The dust cap of claim 1, wherein the third surface and the fourth surface each include a curvature, the curvature of the third surface reduces the divergence of the optical beam, the curvature of the fourth surface increases the convergence of the optical beam, the first surface collimates the optical beam emitted by the first optical fiber by further reducing the divergence of the optical beam, and the second surface focuses the optical beam onto the second optical fiber by further increasing the convergence of the optical beam.

11. The dust cap of claim 10, wherein the curvature of the third surface reduces the divergence of the optical beam along a first axis, the curvature of the fourth surface increases the convergence of the optical beam along a second axis, the first surface reduces the divergence of the optical beam along a third axis orthogonal to the first axis, and the second surface increases the convergence of the optical beam along a fourth axis orthogonal to the second axis.

12. A loopback dust cap for a fiber optic cable including a first optical fiber terminated by a first ferrule and a second optical fiber terminated by a second ferrule, comprising a body including:

a first cavity configured to receive the first ferrule;

a second cavity configured to receive the second ferrule; and one or more third cavities that:

define a first surface configured to redirect and to reduce a divergence of an optical beam emitted by the first optical fiber, and define a second surface configured to further redirect and to increase a convergence of the optical beam so that the optical beam is focused onto the second optical fiber.

13. The dust cap of claim 12, wherein the first cavity includes a first stop that positions the first ferrule relative to the first surface so that the optical beam propagating between the first surface and the second surface is collimated by the first surface, and the second cavity includes a second stop that positions the second ferrule relative to the second surface so that the optical beam is focused on the second optical fiber by the second surface.

14. The dust cap of claim 12, wherein the first surface and the second surface are each defined by the same third cavity.

15. The dust cap of claim 14, wherein each of the first cavity and the second cavity includes an open end that opens into the same third cavity.

16. The dust cap of claim 12, wherein the optical beam is redirected through total internal reflection at each of the first surface and the second surface.

17. The dust cap of claim 16, wherein the first surface and the second surface each include a reflective coating, and the optical beam is redirected and the divergence of the optical beam is reduced through external reflection by the reflective coating at the first surface, and the optical beam is further redirected and the convergence of the optical beam is increased through external reflection by the reflective coating at the second surface.

18. A method of fabricating a loopback dust cap for a fiber optic cable including a first optical fiber terminated by a first ferrule and a second optical fiber terminated by a second ferrule, comprising:

defining a first cavity configured to receive the first ferrule in a body of transparent material;

defining a second cavity configured to receive the second ferrule in the body of transparent material;

defining a plurality of surfaces in or on the body of transparent material configured to collimate an optical beam emitted by the first optical fiber, redirect the optical beam so that the optical beam is aligned with the second optical fiber, and focus the optical beam on the second optical fiber.

19. The method of claim 18, wherein:

the first cavity defines a first surface of the plurality of surfaces, the second cavity defines a second surface of the plurality of surfaces, the first surface is configured to reduce a divergence of the optical beam emitted by the first optical fiber, and the second surface is configured to increase a convergence of the optical beam so that the optical beam is focused onto the second optical fiber.

20. The method of claim 18, wherein:

the plurality of surfaces includes a third surface configured to redirect the optical beam, and a fourth surface configured to further redirect the optical beam so that the optical beam is received by the second optical fiber.

* * * * *